(12) United States Patent
Vigen et al.

(10) Patent No.: US 7,660,189 B2
(45) Date of Patent: Feb. 9, 2010

(54) APPARATUS, SYSTEMS AND METHODS FOR DETERMINING POSITION OF MARINE SEISMIC ACOUSTIC RECEIVERS

(75) Inventors: Erik Vigen, Honefoss (NO); Svein Arne Frivik, Oslo (NO); Kambiz Iranpour, Oslo (NO); Kenneth Welker, Nesoya (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 12/178,782

(22) Filed: Jul. 24, 2008

(65) Prior Publication Data
US 2008/0279045 A1    Nov. 13, 2008

Related U.S. Application Data

(62) Division of application No. 11/114,789, filed on Apr. 26, 2005, now Pat. No. 7,417,924.

(51) Int. Cl.
*G01V 1/38* (2006.01)
(52) U.S. Cl. .................... 367/15; 367/106
(58) Field of Classification Search .......... 367/14, 367/15, 89, 106, 130, 127, 129
See application file for complete search history.

(56) References Cited

U.S. PATENT DOCUMENTS

| | | | | | |
|---|---|---|---|---|---|
| 3,388,372 | A | * | 6/1968 | De Witz | 367/89 |
| 4,992,993 | A | * | 2/1991 | Chambers | 367/21 |
| 5,734,623 | A | * | 3/1998 | Ruffa | 367/131 |

* cited by examiner

*Primary Examiner*—Ian J Lobo
(74) *Attorney, Agent, or Firm*—Jeff Pyle; Richard V. Wells; Kevin McEnaney

(57) ABSTRACT

Apparatus, systems and methods for calculating position of marine seismic acoustic receivers, and for estimating sound velocity profile of a fluid, are disclosed. One position calculation system includes a vessel, two or more vessel hull-mounted transmitters, a plurality of acoustic receivers on a cable being deployed from the vessel into the fluid, and a calculation unit. The calculation unit may be adapted to calculate position of the receivers, and may be used in calculating the sound velocity profile in the fluid and correcting raw seismic data. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims. 37 CFR 1.72(b).

10 Claims, 4 Drawing Sheets

APPARATUS, SYSTEMS AND METHODS FOR DETERMINING POSITION OF MARINE SEISMIC ACOUSTIC RECEIVERS

RELATED APPLICATION

This application is a divisional application of a co-pending U.S. non-provisional patent application, Ser. No. 11/114,789, filed on Apr. 26, 2005, by the same inventor with the same title, which is hereby incorporated by reference in its entirety.

BACKGROUND OF THE INVENTION

1. Field of Invention

The present invention relates generally to the field of marine seismic equipment, and specifically to position determination of marine seismic acoustic receivers, and estimations sound velocity profile in fluids.

2. Related Art

Marine seismic exploration investigates and maps the structure and character of subsurface geological formations underlying a body of water. In so-called seabed seismic, a cable containing seismic receivers is deployed onto the seabed from a surface vessel. The seismic operation needs accurate position determination of the receiver cable, and the typically used method for positioning is based on underwater acoustic ranging. Descriptions of so-called "base-line" positioning systems and methods may be found in textbooks and on the Internet. These include long-base-line (LBL), short-base-line (SBL), ultra-short-base-line (USBL), long-and-ultra-short-base-line (LUSBL); and even long-short-and-ultra-short-base-line (LSUSSL) systems and methods. The conventional way of determining the position of seabed seismic receiver cables is by use of USBL systems that are commercially available; however, USBL systems are not known to be used for estimating or calculating sound velocity profile of a fluid. Focusing on position determination, the main drawbacks with USBL systems are that they require transmitters to be mounted on the cable for every point to be tracked. This is a safety hazard for personnel working on the back deck on the deployment vessel, and it also reduces the maximum feasible speed of cable deployment and recovery. It is thus an economically impaired technique. Compared to the proposed techniques it is also less efficient in that the number of transmitters it is possible to fit on the cable is a number far less than the number of seismic receivers. The positions provided by the USBL system will only be at selected intervals and they do not coincide with the seismic receiver positions, so that one must interpolate based on the transmitter positions.

SBL systems generally utilize a transmitter mounted on the remote target, and the accuracy of the angular measurement provided comes from the use of sophisticated techniques for correlation of the observed signal at receivers located with a short baseline separation. The correlation aims at determining the difference in time of reception between pairs of receivers. The idea is that the signals observed at the two locations have the same source and are distorted in a similar way so that a good correlation can be found. The fact that the signal gets transmitted into the noisy area around the vessel hull is a disadvantage of this method as it poses further challenges on the sensing and processing of the signal.

From the above it is evident that there is a need in the art for improvement in positioning of marine seismic seabed cables and other seismic equipment.

SUMMARY OF THE INVENTION

In accordance with the present invention, apparatus, systems and methods are described to determine position of seismic seabed cables, both during deployment and as they rest on a seabed, and, in certain cases, towed seismic streamers, and methods of using this information to correct raw seismic data. Also provided are apparatus, methods, and systems for determining sound velocity profile of a fluid. Apparatus, systems and methods of the invention reduce or overcome problems with previous positioning apparatus, systems and methods. Apparatus, systems and methods of the invention may be used to collect marine seismic data, for example 3-D and 4-D marine seismic data.

A first aspect of the invention is an apparatus comprising:
(a) at least two vessel hull-mounted transmitters, each adapted to generate a spread spectrum signal having an orthogonally encoded signal sequence;
(b) a plurality of acoustic receivers adapted to be along or in one or more cables, the cable adapted to be in or traversing through the fluid with a vertical component, each receiver adapted to receive at least the spread spectrum signals; and
(c) a calculation unit adapted to cross-correlate the spread spectrum signals detected by the receivers with the orthogonally encoded signal sequence of the spread spectrum signals, and adapted to use measured time differences between detection of the spread spectrum signals at each receiver and measure differences in arrival time between signals from the transmitters to each receiver, to calculate distances between the receivers.

Apparatus within this aspect of the invention, which may be termed a short-baseline (SBL) apparatus, include those wherein the transmitters are all positioned on the under side of a vessel hull, or bulb of the hull of vessel having a bulb. In certain embodiments three transmitters may be used. In other embodiments, only two transmitters are required, and depth of receivers in the Z coordinate may be obtained using pressure measuring devices, avoiding the need for a third or more transmitters. The transmitters may be stationed a known distance from a known or obtainable vessel reference point, for example on one or more substantially vertical members attached to the vessel and adapted to extend into the fluid. The members may be extendable/retractable poles, such as telescoping poles, or solid members. At least one of the transmitters may be used in a method to compute the sound velocity profile. Alternatively, the sound velocity profile may be previously known, or estimated using less accurate, previously known techniques, using velocity meters, salinity meters, temperature gages, and so forth.

The transmitters may be adapted to generate spread spectrum signals at any frequency. In certain applications this frequency may range from about 500 to about 4000 Hz. The signals may be transmitted in response to a given command, which need not be scheduled at any given time; indeed they may be randomly transmitted. The transmitters may be controlled to deliver their spread spectrum signals in synchronized fashion relative to a given seismic event, and different orthogonal codes may be used for individual spread spectrum signals. The transmitters may be conventional underwater audio-acoustic transmitters. The principal requirement of the transmitters is that they should be capable of transmitting a signal which is sufficiently strong to be able to be received several kilometers from the transmitter and that the signals or codes which are transmitted also contain frequency components which lie within the frequency band which the receivers (hydrophones) are capable of detecting. The further apart the transmitters are placed the better the positioning resolution which is obtained.

A second apparatus of the invention comprises:
(a) an acoustic transmitter adapted to transmit an acoustic signal having a vertical component through a fluid;
(b) a plurality of acoustic receivers adapted to be in or along one or more cables, the cable adapted to be in or traversing through the fluid with a vertical component; and
(c) a calculation unit able to calculate a sound velocity profile of the fluid based on reception times of the signal at the receivers.

Apparatus in accordance with this aspect of the invention may comprise a marine seismic streamer cable or seabed seismic cable capable of operating in a marine environment and including the plurality of acoustic seismic receivers spaced all along the cable, the receivers able to receive both seismic and non-seismic acoustic signals, and the cable may extend at a dip angle from vertical from a surface vessel to a substantial depth and then level out as a seismic marine steamer, or may extend to the seabed substantially at this dip angle and be deployed on the seabed, where the seabed can take any geometry. Alternatively, in some embodiments the cable may not be a seismic cable having seismic receivers, but receivers dedicated only to reception of acoustic signals from the transmitter. At least a portion of the cable may be changing depth in the fluid as the acoustic signal traverses the fluid. The receivers may be built in to the cable at known positions, or they may be attached to the cable at known intervals so that the exact distance between the receivers is known, at least in that portion of the cable descending from the tow vessel at an angle to horizontal. The receivers may be a part of an acoustic ranging network, where the receivers on the cable and receivers and transmitters on other cables are synchronized so that the transmission delay between a transmitter and a receiver may be measured. The transmitter may be attached to a vessel deploying a seismic cable, to another vessel such as a submersible vehicle in the water or on the seabed, or to some other spread component. The receivers may be capable of sending information about when the signal from the transmitter is received by each receiver to a microprocessor. The receivers may be of a combined type that can record both the low frequency seismic signals, and the higher frequency signals normally used for positioning purposes, or they may be dedicated to the positioning frequencies only. The microprocessor may include software able to calculate the sound velocity through water using the time differences and distances between receivers, since the acoustic signal propagates almost parallel to the cable. The apparatus may be part of a combination of components, including a deployment vessel, reels for deploying and retrieving the cable, data storage units, computation units, and the like.

A first system of the invention comprises:
(a) a vessel;
(b) at least two vessel hull-mounted transmitters, each adapted to generate a spread spectrum signal having an orthogonally encoded signal sequence;
(c) a plurality of acoustic receivers adapted to be along or in one or more cables, the cable adapted to be in or traversing through the fluid with a vertical component, each receiver adapted to receive at least the spread spectrum signals; and
(d) a calculation unit adapted to cross-correlate the spread spectrum signals detected by the receivers with the orthogonally encoded signal sequence of the spread spectrum signal, and adapted to use measured time differences between detection of the spread spectrum signals at each receiver and measure differences in arrival time between signals from the transmitters to each receiver, to calculate distances between the receivers.

Another aspect of the invention is a system comprising:
(a) a vehicle;
(b) an acoustic transmitter on the vehicle adapted to transmit an acoustic signal having a vertical component through a fluid;
(c) a plurality of acoustic receivers adapted to be along or in one or more cables, the cable adapted to be in or traversing through the fluid with a vertical component; and
(d) a calculation unit able to calculate a sound velocity profile of the fluid based on reception times of the signal at the receivers.

The vehicle may be a single vehicle or more than one vehicle, for example two surface vessels and a submersible vehicle, as long as one of the vehicles has the transmitter attached thereto. Systems of this aspect of the invention may include an under water positioning system, which may include SBL (short base line) or USBL (ultra-short base line) acoustic sensors to approximate positions of the receivers. The transmitter position may be known from a predetermined offset from the vehicle's reference point or the origin of the vehicle's body coordinate frame. The relative positions of the transmitter, the receivers and the cable, if used allow a geometric compensation of the measurements described herein. Optionally, systems of the invention may include components capable of determining the vehicle's attitude, such as inclinometers. This may allow higher accuracy measurements between the transmitter and receivers.

Another system of the invention comprises:
(a) a plurality of acoustic transmitters, the transmitters spaced along a marine seismic cable being deployed from or retrieved by a vessel;
(b) an ultra-short baseline acoustic receiver unit mounted to the vessel, the receiver unit having a plurality of acoustic sensing elements, at least a portion of the sensing elements being in view of the cable being deployed or retrieved; and
(c) a calculation unit able to calculate a sound velocity profile of a fluid based on reception times of the signals at the sensing elements.

A method of the invention comprises obtaining a substantially accurate estimate of the absolute position of receivers in the streamer as it is towed, or seabed cable as it is being deployed, retrieved, or rests on the seabed. One method comprises:
(a) generating and transmitting different spread spectrum signals from two or more vessel hull-mounted acoustic transmitters, the signals each having an orthogonally encoded signal sequence, the spread spectrum signal having a prominent peak in an autocorrelation function thereof,
(b) detecting the spread spectrum signals using acoustic receivers stationed along one or more cables at different vertical distances in a fluid;
(c) measuring a time difference for reception of each signal at two or more receivers and differences in arrival time between signals from the transmitters to each receiver; and (d) using the measured time differences and differences in arrival times and cross-correlating the spread spectrum signals detected by the receivers with the orthogonally encoded signal sequence of the spread spectrum signals to determine distances between the receivers.

When applied to the situation of a seabed cable resting on the seabed, the method may be deemed a "long baseline method", wherein one or more transmitters is moved sequentially to different locations near the sea surface. In this way the position of the seabed cable receivers may be determined.

Yet another method of the invention is a method of using the determined positions of the streamer or seabed cable receivers to acquire more accurate marine or seabed seismic data, or correct previously acquired data.

Another method of the invention comprises determining a sound velocity profile of a fluid, the methods comprising:

(a) transmitting an acoustic signal having vertical component through a fluid;
(b) providing a plurality of acoustic receivers adapted to be in or along one or more cables, the cable adapted to be in or traversing through the fluid with a vertical component;
(c) measuring transmission times of the acoustic signal to the receivers; and
(d) using the transmission times and known distances between the receivers and the transmitter to estimate a sound velocity near each receiver, thus producing a sound velocity profile.

Methods of determining sound velocity profile of the invention include those methods wherein the step of providing a plurality of acoustic receivers adapted to be in or along one or more cables in or traversing through the fluid comprises deploying or retrieving a seismic cable having the acoustic receivers in the cable, and the seismic cable may be deployed or retrieved at a dip angle. When using this option one may approximate the position of the receivers using an underwater acoustic positioning system using the known relative positions of the receivers in the cable, the transmitter, and optionally the cable. A geometric compensation of the distance measurements between receivers may be required if the transmitter is weakly lined up with the cable. The actual distances between receivers may then be calculated from the initial known relative positions of the receivers in the cable and the calculated geometric compensation. Time measurement differences may be determined directly by autocorrelation of two recordings at two adjacent receivers, or between non-adjacent receivers. The accuracy of each estimate of the sound velocity is limited by the precision of the acoustic signal detection. In order to get a sound velocity profile with a useful accuracy it may be necessary to perform more measurements and accumulate them in a statistically meaningful amount. The line or seismic cable may be several kilometers long and the receiver intervals as small as 25 meters or less. This gives room for many measurements to be taken and cancellation of random errors. The sound velocity profile may then be determined in the form of a table by using the statistically meaningful results within certain depth intervals, or it may be determined by using a parameterized model where all the results are used to estimate the unknown parameters. If a cable having receivers is used, a second approach would be to take advantage of the fact that the cable is moving continuously down or up through the water column while the measurements are taken thus providing almost continuous information.

Another method of the invention comprises:

(a) transmitting a plurality of acoustic signals each having a vertical component from a plurality of acoustic transmitters in or along one or more cables, the cables adapted to be in or traversing through the fluid with a vertical component;
(b) receiving the plurality of acoustic signals by an ultrashort baseline receiver unit comprising a plurality of receiver sensors;
(c) measuring transmission times of the acoustic signals to the receiver sensors; and
(d) using the transmission times and known distances between the receiver sensors and the transmitters to estimate a sound velocity in the fluid near each transmitter, thus producing an estimated sound velocity profile.

The above apparatus, systems and methods of the invention, as well as other aspects of the invention, will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

Figure 1:
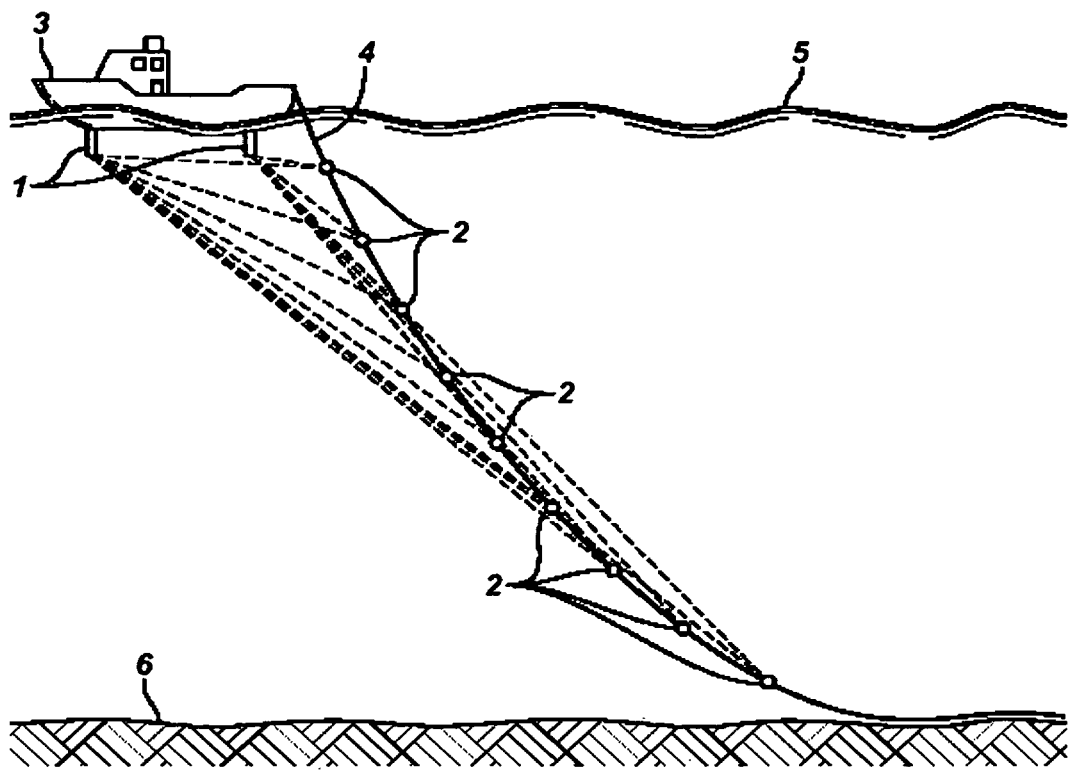
FIG. 1 is a schematic illustration of an apparatus, system, and method of the invention to determine position of receivers in a seabed seismic cable being deployed.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The present invention describes apparatus, systems, and methods to determine position of seabed seismic cables, as well as sound velocity profile of a fluid. The conventional way of determining the position of seabed seismic receiver cables is by use of USBL systems that are commercially available;

however, USBL systems are not known to be used for estimating or calculating sound velocity profile of a fluid. The main drawbacks with USBL systems in position determination are that they require transmitters to be mounted on the cable for every point to be tracked. This is a safety hazard for personnel working on the back deck on the deployment vessel, and it also reduces the maximum feasible speed of cable deployment and recovery. It is thus an economically impaired technique. Compared to the proposed technique it is also less efficient in that the number of transmitters it is possible to fit on the cable is a number far less than the number of seismic receivers. The positions provided by the USBL system will only be at selected intervals and they do not coincide with the seismic receiver positions so that one must interpolate based on the transmitter positions.

SBL systems generally utilize a transmitter mounted on the remote target, and the accuracy of the angular measurement provided comes from the use of sophisticated techniques for correlation of the observed signal at receivers located with a short baseline separation. The correlation aims at determining the difference in time of reception between pairs of receivers. The idea is that the signals observed at the two locations have the same source and are distorted in a similar way so that a good correlation can be found. The fact that the signal gets transmitted into the noisy area around the vessel hull is a disadvantage of this method as it poses further challenges on the sensing and processing of the signal. This is fundamentally different from the inventive apparatus, systems, and methods, where the transmitters are located in the noisy area and sends signals into a quiet area where the receivers are located.

FIG. 1 illustrates an apparatus, system, and method of the invention to determine an accurate position of receivers 2 in a seabed cable 4 being deployed onto or retrieved from a seabed 6. Two or more acoustic transmitters 1 are fitted onto the hull of the cable deployment vessel 3 riding on sea surface 5. As stated earlier, transmitters 1 may be mounted on retractable poles or similar devices, not shown, in order to get the transmitters positioned at the optimum depth for the transducer operation. The positions of transmitters 1 need to be known in the vessel body referenced coordinate system, and they may be arranged to form a line, a plane when three transmitters 1 are used, or a volume when three or more transmitters are used. If they are arranged in a straight line, as when two transmitters 1 are used, it is not possible to do positioning without auxiliary sensor measurements, such as pressure sensors to measure pressure, and thus depth. If three or more transmitters 1 are arranged in a plane, receivers 2 to be positioned have to be outside this plane or its extension. This can be ensured by planning the transmitter locations so that the plane tilts away from cable 4 axis as much as possible. Seabed seismic receiver cable 4 is fitted with a number of seismic receivers 2 that are adapted to be used for sensing of seismic signals. The same receivers may also be capable of receiving the signals sent by transmitters 1 to be used for the positioning purpose. Alternatively, dedicated positioning receivers may be used as well as dedicated seismic receivers, but this may result in more expensive equipment, and is therefore not desired as much as the dual function receivers.

When the system is operated, transmitters 1 send synchronized broad spectrum and coded signals, as further described herein. The signals from transmitters 1 are received by all receivers 2 and processed to determine the signal travel time and the travel time differences. When knowing or estimating the sound velocity the travel time can be converted to a distance and the travel time difference to a distance difference. The difference needs to be established with a higher accuracy than the distance for a short baseline system to work well. Conventional systems ensure that by transmitting one signal that is received by two or more receivers where the difference in reception time can be established through autocorrelation of the recordings between pairs of receivers. In the inventive apparatus, system, and method depicted in FIG. 1, where there is a multitude of transmitters 1 sending different signals that are received by one or more receivers 2 at unknown distance, the same approach is not possible. When using broad spectrum, encoded signals, the correlation results from the travel time detection can be further used to establish an accurate time difference. As an alternative, a conventional USBL receiver group positioned on the vessel hull could be used to establish the sound velocity profile from known distances between seismic receivers on or in the cable. In this alternative embodiment of the invention, the seismic receivers on or in the cable must be transponders or transducers capable of receiving and transmitting acoustic signals.

The position and attitude of vessel 3 at the synchronized time event when transmitters 1 send the signal can be determined for instance by using GPS or other positioning system. This information combined with the vessel body frame coordinates of transmitters 1 is sufficient to calculate the positions of transmitters 1 at the time of measurement. By further using the information about the measured distances and differences it is possible to calculate the position of each receiver 2 that has received the signals. All receivers 2 in or on cable 4 can this way be tracked for the purpose of deployment precision, increased operational safety, and increased efficiency.

The positioning system may also be augmented with additional sensors for increased robustness of the system. Such devices are for instance, but not limited to, inclinometers, pressure gauges, compasses and inertial sensors integrated in or placed on cable 4, and further acoustic measurements provided by transmitters located on buoys or other vessels. In three dimensional cable and streamer positioning under water, the third component, depth, is often difficult or expensive to estimate with acoustic measuring devices alone. This may be due to the cost of obtaining a geometry that will give a well-separated vertical component for the target being positioned. For example, in seabed cable deployment, the deploying vessel travels horizontally away from cable being laid on the sea bottom. As the cable moves through the water column, its depth is dependent on factors not easily measurable, including cable buoyancy due to varying water density layers and currents with a vertical component, especially upward. In order to establish the depth through acoustics, the acoustic distances and distance differences measured need to have position fixing geometry strong enough to separate it from the horizontal components. With measurement information all or mostly in the same plane, the number of positions that will fit the measurements is large, each with a different distance out of the plane. To obtain this requires one or more separate transmitter units deployed on platforms different from the deploying vessel, the number of such units being dependent on the depth of the water column, and thus the horizontal extent of the cable in the water column during a deployment or along the cable length on the bottom after deployment. Especially in the context of time laps survey requirements, (but also for the purpose of establishing and confirming the vertical component of position in conventional seismic surveying), deploying the cable to a predetermined point on the seafloor can best be done if the position of the cable is known during it's descent. This information will allow the deploying vessel to maneuver in a way that will influence the final resting place of the cable on the seafloor. Two towed marine applications are Over/Under surveys and surveys employing a positioning streamer. In these towed marine application, acoustic ranging may occur between streamers at different depths, and determining depth other than by acoustics is useful. In certain embodiments of the present invention, it would be useful to employ a depth-measuring unit integrated into or attached to the cable at regular intervals that does not employ acoustic ranging from a known point, but instead determines depth by measuring pressure. Knowing this component of the three dimensional coordinates will constrain the points that are available for the measurements to fit into a horizontal plane and thus allow a better estimate of cable position with less effort than required with acoustics only. Apparatus, systems, and methods of the invention using a seabed cable being deployed, retrieved, or resting on the seafloor, so-called short-baseline systems and methods, may particularly benefit from using pressure measurements to determine depth.

Some of the advantages of the apparatus, systems, and methods illustrated in FIG. 1 and other embodiments are that they may easily be fully automated using a computer to control and do the necessary computations; there is no need to attach or detach any equipment to and from the cables during deployment and retrieval; there is consequently no need for manual work on the back deck of the deployment vessel giving a big safety advantage; full automation, if provided, allows faster cable operation and high operational efficiency; the systems and methods do not require additional vessels, buoys or other devices on the water to facilitate the positioning with further added safety and efficiency benefits, although they may be employed if desired; and the systems and methods may directly provide positions "as deployed" for the seismic receivers.

Useful transmitters 1 are those able to transmit spread spectrum signals that are unique acoustic signals lying within a frequency band that receivers 2 (hydrophones) are capable of detecting. The signals may be intercepted by conventional seismic receivers 2, which are already located in cables 4, or in the streamers or in the gun array cables. By using the existing receivers in the seabed cables and streamers a far better spatial resolution along the cable will be obtained than that achieved by means of the prior art.

In use, transmitters 1 may transmit a signal on command. Receivers 2 will intercept the signal and transmit it on board the vessel for processing and storing. There is no rule governing when the codes from the spread spectrum transmitters should be transmitted or recorded. Transmission may be simultaneous and recording may be done during the normal recording time for a shot or also between each shotpoint. Seismic signals are normally recorded and stored during a period of 4 to 12 seconds after a shot has been fired. The signals from transmitters 1 can be recorded when wished, since there is no correlation between the seismic signal and the spread spectrum codes, i.e. it is not possible to confuse a seismic signal from a seismic source (not shown) with a spread spectrum signal transmitted from a transmitter 1. Had a transmitter been used which transmitted signals on a specific frequency, this would cause them to be confused with seismic signals on the same frequency. Due to the signal-to-noise ratio, the normal procedure may be to time the transmission to maximize the offset in time between the seismic and positioning acoustic events and record the signals once per shot.

The signals that are transmitted from transmitters 1 in accordance with this aspect of the present invention are so-called orthogonal spread spectrum signals. Spread spectrum techniques are described in the literature and well known by those skilled in the art. An ordinary modulation technique is based on the fact that the transmitted signal uses a certain part of the frequency band in a communication channel, e.g. by means of frequency modulation (FM) or amplitude modulation (AM). As distinct from this, in spread spectrum modulation the entire bandwidth in a communication channel will be used and split up a transmitted signal frequency, the individual parts being transferred on several different frequencies. Only the receivers will know which frequency and phase combination the incoming information will have. The receivers know a transmitter's individual code. By cross-correlating the incoming signals ($y(n)$) with a transmitter's individual code ($x(n)$), a receiver will be able to extract the unambiguous spread spectrum signal from the range of other signals. An $n=t_\infty$ cross-correlation function will be in the form:

$$r_{xy}(\tau) = \sum_{n=-\infty}^{n=+\infty} y(n-\tau) \cdot x(n).$$

When a sequence is cross-correlated with itself the process is called autocorrelation.

The autocorrelation function of a series $x(n)$ will always have a certain top value for $\tau=0$. It is desirable for spread spectrum sequences which are used for positioning of seismic equipment to have an autocorrelation function which represents a "white noise" pattern apart from $\tau=0$. In order to avoid false detection of, e.g., signals that are recorded by the same receiver use the same communication line, the cross-correlation function between the codes must have a top value that is as low as possible, which is the definition of orthogonal.

Figure 2:
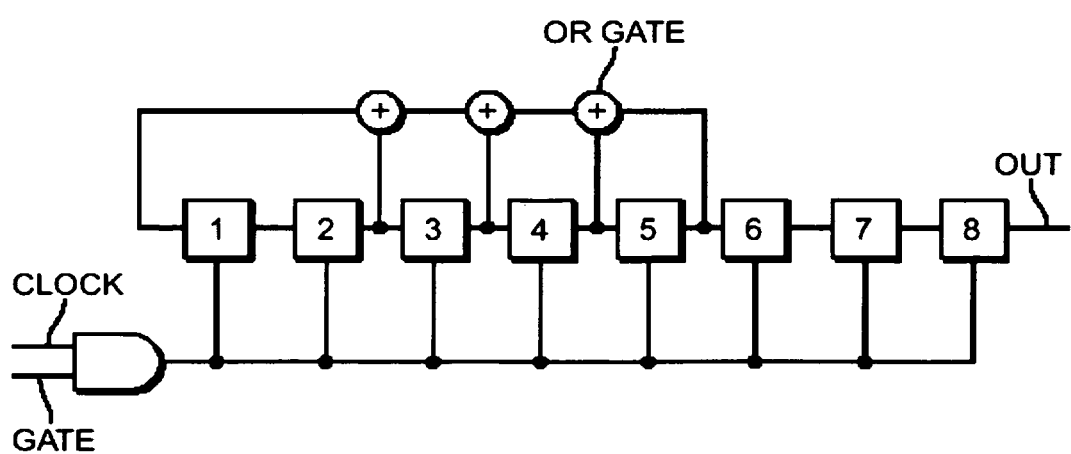
FIG. 2 is a representation of an eight bit serial shift register useful in the invention.

The transmission pulse comprises a set of orthogonal pulses with an unambiguous top in their respective autocorrelation functions. Several conventional methods of generating such functions can be mentioned. Perhaps the most common method uses random sequence codes called Gold codes. This method provides a selection of codes that give low values in the cross-correlation function. These are generated by the use of shift registers of variable length with a special feedback pattern. When used in the present invention a register of this kind will normally look like that illustrated in FIG. 2. The figure is a representation of a Gold code [5,4,3,2]. The figure illustrates an eight bit serial shift register which will give a $2^8=256$ bit long sequence.

There are several methods for generating pseudorandom sequences, e.g. frequency hopping, frequency shift coding or phase coding. Regardless of which pseudorandom sequence is chosen, it is important for its autocorrelation function to have a distinct top value and for the cross-correlation to be as low as possible. Even with signal amplitudes down towards the signal amplitude for sea noise it will be possible to extract a correlation's top.

Even calculation of positions for the seismic equipment or the sensors can be performed in countless different and conventional ways depending on which parameters are known for the system and how the system is configured. The common feature of all methods of this aspect of the invention, however, is that the received signals have to be cross-correlated with the transmitting signal signature of the specific transmitters to which the absolute or relative distance is required to be determined. Further processing of data is performed according to the prior art. Note that in certain towed marine spreads there may not be enough unique codes for each transmitter. To work around this limit transmitters with the same code may be separated in space so they do not interfere with one another.

The simplest case comprises a transmitter and a receiver where the system is designed in such a manner that accurate information is available as to when the transmitter transmits in relation to the receivers sampling points. After the above-mentioned cross-correlation a maximum value will be found in the cross-correlation function that indicates the absolute time difference between transmitter and receiver. It will be possible to develop this technique used on a seabed cable or streamer with several sensors in order to obtain an unambiguous geometrical network of distances and relative positions.

The invention also describes apparatus, systems, and methods to determine the accurate velocity of sound through the water column. It is particularly well adapted to, but not limited to, seabed seismic data acquisition, where a cable containing seismic receivers is deployed on to the seabed from a surface vessel. In some embodiments, one or more towed streamer cable may be used in the sound velocity profile determination and positioning aspects of the invention. In any case, the seismic operation needs accurate position determination of the receivers in the cable, and the typically used method for positioning is based on underwater acoustic ranging. A system for hydro-acoustic ranging, for example, intrinsic ranging by modulated acoustics, comprises transmitters that generate an acoustic signal and hydrophones that can receive the signal. The transmitters and the receivers are synchronized so that the transmission delay between a transmitter and a receiver can be measured. If the velocity of sound through the water media is known it is possible to convert the measured delay into distances that are the data of prime interest for position determination.

Less than perfect knowledge of the sound velocity may result in positioning errors and this is in many cases the single limiting factor in obtaining high accuracy. The present invention reduces or overcomes problems with previous apparatus, systems, and methods by measuring the sound velocity through the water column. The cable being deployed or retrieved has receivers at known positions meaning that the exact intervals between them are known. For convenience we will discuss deployment of receiver cables on a seabed, but the invention is not so limited. The deployment vessel may carry a transmitter that sends acoustic signals toward the cable, and the receivers in the cable are picking up this signal. Different time delays may be measured along the cable, which may be from very near the vessel, to a portion of the distance to the seabed, or all the way down to the seabed. The combination of the known cable length and the measured time delays can give information about the sound propagation speed by utilizing the fact that the acoustic signal propagation may be substantially parallel to the cable. Combining the information from pressure depth sensors with knowledge of the separation between receivers along the cable can further strengthen the vertical acoustic propagation speed estimate, (i.e., sound velocity profile), by better establishing the vertical component of the distance measurements, and thus cable dip. Differencing the two depth measurements to eliminate any common error due to inaccurate water density or atmospheric pressure assumptions can reduce inaccuracies in pressure measurement. The depth measurement difference gives the vertical separation between the two receivers, and thus the vertical difference of the range difference measurement. A single measurement may not give very accurate information, but repeated measurements as the cable is deployed or retrieved may improve the determination.

Referring now to FIGS. 3-8, FIG. 3 illustrates schematically and not to scale an apparatus, system, and method of the invention for determining sound velocity profile, including a transmitter 1 mounted on a deployment vessel 3 in combination with a seabed cable 4 and its receivers 2, however, the invention is not so limited, as will become apparent. Seabed cable 4 containing seismic receivers 2 is illustrated being deployed on to the seabed 5 from a surface cable deployment vessel 3, although the vessel could be retrieving the cable. Receivers 2 pick up under water acoustic signals, and may be of a combined type that can record both the low frequency seismic signals and the higher frequency signals normally used for positioning purposes, or they can be dedicated to the positioning signals only. Receivers 2 may be built into cable 4 at known positions or they may be attached to the cable at known intervals so that the exact distance between the receivers are known. Receivers 2 may be part of a system for hydro-acoustic ranging, for example intrinsic ranging by modulated acoustics, as described in U.S. Pat. No. 5,668,775, assigned to WestemGeco LLC, Houston, Tex., which also comprises transmitters that generate the acoustic signal. The transmitters and the receivers may be synchronized so that the transmission delay between a transmitter and a receiver can be measured.

The approximate positions of receivers 2 may be determined by use of an under water positioning system, for instance an ultra short baseline (USBL) acoustic system or a short baseline (SBL) acoustic system, and the position of transmitter 1 is known from a predetermined offset from the vessel's reference point or the origin of the vessel's body coordinate frame. The approximate position of the cable is given by receiver 2 positions. Transmitter 1 is positioned so its emitted acoustic signals travel substantially parallel to cable 4 or its extension. A geometric compensation of the measurements may become necessary if transmitter 1 is weakly lined up with cable 4. The compensation requires knowledge of the relative positions of transmitter 1, receivers 2 and cable 4, and their required accuracy will increase with the deviation from the line.

Figure 3:
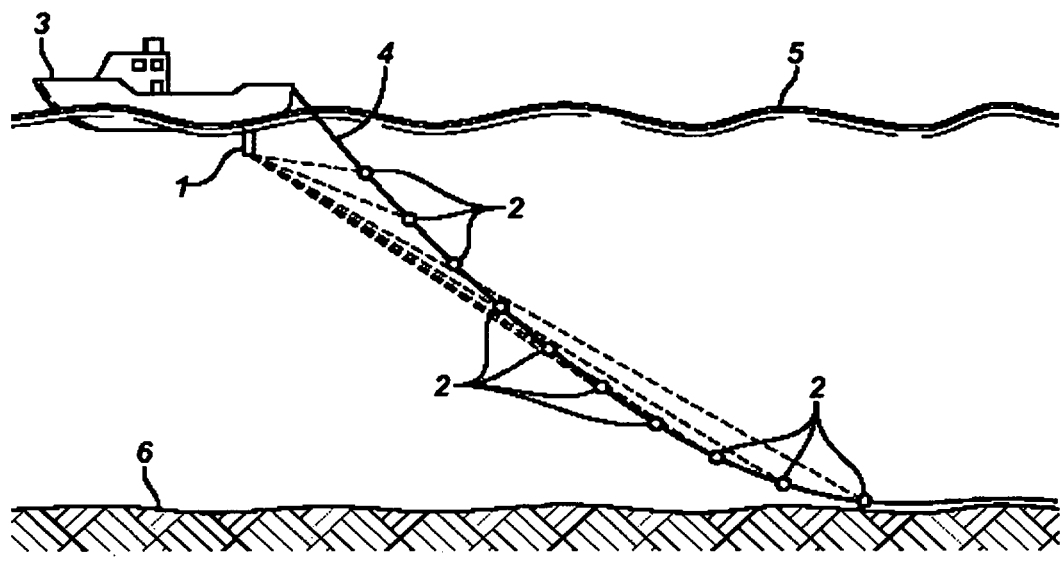
FIGS. 3-8 are schematic illustrations of six different embodiments of the invention to determine sound velocity profile in a fluid.

Given the embodiment described in FIG. 3 it is possible to measure the transmission delay of under water acoustic signals from transmitter 1 to each of receivers 2, and use the differences in time delay to each receiver to cancel most of the errors in approximating the position. In previously known methods, an estimate of the under water sound velocity was computed as the ratio between the calculated distance between transmitter 1 and one of the receivers 2 and the corresponding transmission delay measured. However, the limitation in that approach is that this will only have an accuracy comparable to the accuracy of the positioning system used to determine positions of receivers 2.

Figure 4:
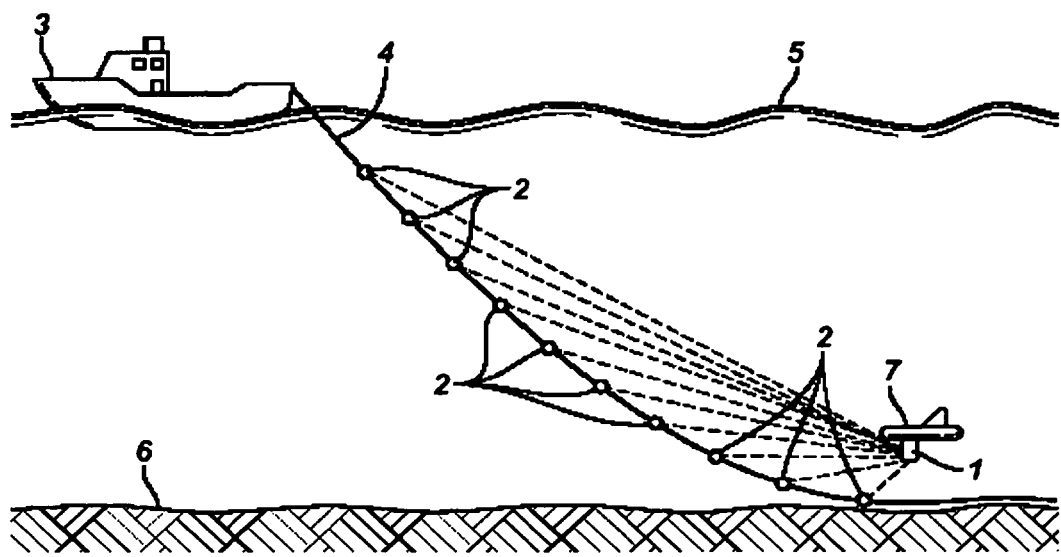

FIGS. 4-8 illustrate five other embodiments for determining sound velocity profile in accordance with the invention. FIG. 4 illustrates an embodiment of the invention wherein the transmitter is not mounted on the vessel 3, but rather on a mobile underwater device 7 having a transmitter 1, which follows deployment or retrieval of seabed cable 4. Device 7 may either be a manned vehicle or unmanned vehicle, and may be operated remotely through wireless transmission, or through an umbilical to vessel 3 or another vessel. Transmitter 1 transmits acoustic signals substantially parallel to cable 4, which are received at receivers 2 at slightly different times indicative of their distance from transmitter 1.

Figure 5:
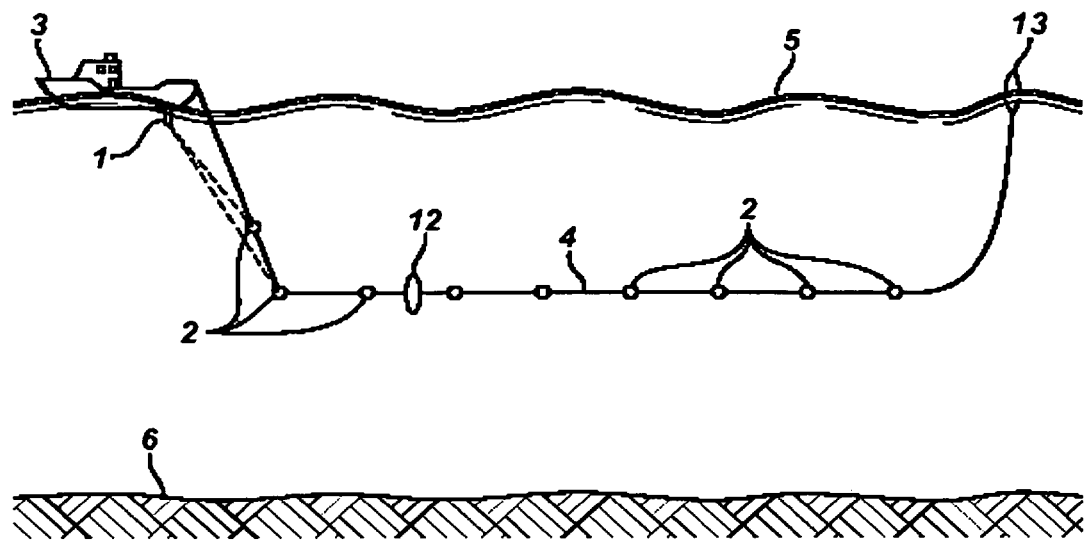

FIG. 5 represents another embodiment, wherein some receivers 2 on a streamer cable 11 are employed. Streamer cable 11 may include any number of steerable birds 12, and may include a steerable tail buoy 13. In operation, some receivers 2 on the downward slope of steamer cable 11 are used which are capable of receiving acoustic signals at least at the frequency transmitted by transmitter 1. As with previous embodiments, this allows sound velocity to be estimated at least in the vicinity of each receiver 2 on the downward slope, and thus a sound velocity profile for that portion of the fluid. Note that steerable bird 12 may be used to temporarily move one or more receivers, normally horizontally spaced, in line with the non-horizontal receivers, for example if more data is needed to compute the sound velocity profile. Another option (not shown) would be to tow a streamer or spread of streamers at different depths and obtain sound velocity at each depth. The sound velocity at each depth could be useful as a less precise, or first estimate of the sound velocity profile. In some instances, streamers are known to "fail", that is, for some reason become not useable from a seismic data acquisition standpoint; a failed streamer for seismic purposes (but with sufficient acoustic receivers) could be positioned with weights or ballast, or steered using birds or other devices, to extend from the tow vessel to some distance below the sea surface, and perhaps very close to the seabed.

Figure 6:
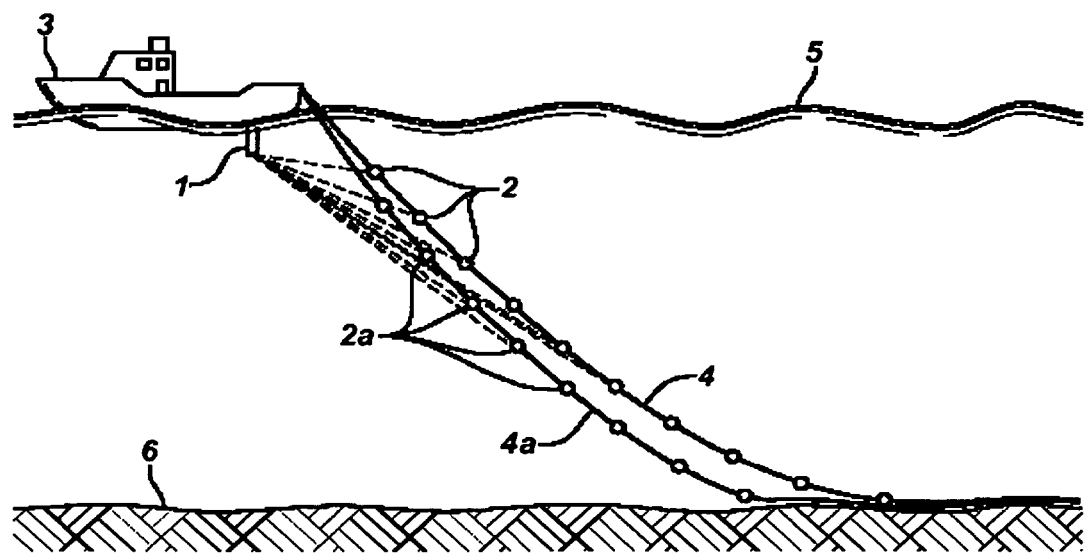

FIG. 6 illustrates another embodiment of the invention, wherein two identical seismic seabed cables 4 and 4a are being deployed, each having a plurality of receivers 2 and 2a, respectively. This embodiment may have advantages such as providing more sound velocity data points for the sound velocity profile, since the cables may be deployed such that receivers 2a are at distances mid-way or near mid-way between receivers 2. More than two cables could be deployed in this fashion. An alternative might be to deploy cables that are not identical. For example, cable 4 might have twice the receivers that cable 4a has, or vice versa. In this case the sound velocity profile calculated using receivers 2 might be checked using receivers 2a.

Figure 7:
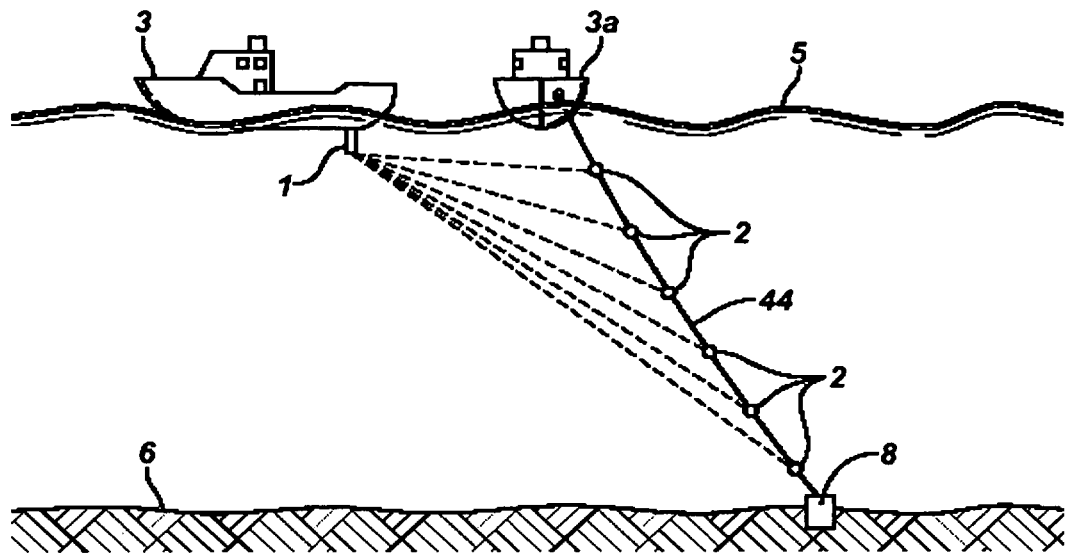

FIG. 7 illustrates another embodiment of the invention, wherein vessel 3 makes use of a companion vessel 3a anchored by an anchor 8 or some other feature on seabed 6. Vessel 3a employs a simple rope or cable 44 on which has been placed or attached receivers 2 in known or well-approximated distances from vessel 3a. Vessel 3 may then be maneuvered so that transmitter 1 is substantially in-line with receivers 2.

Figure 8:
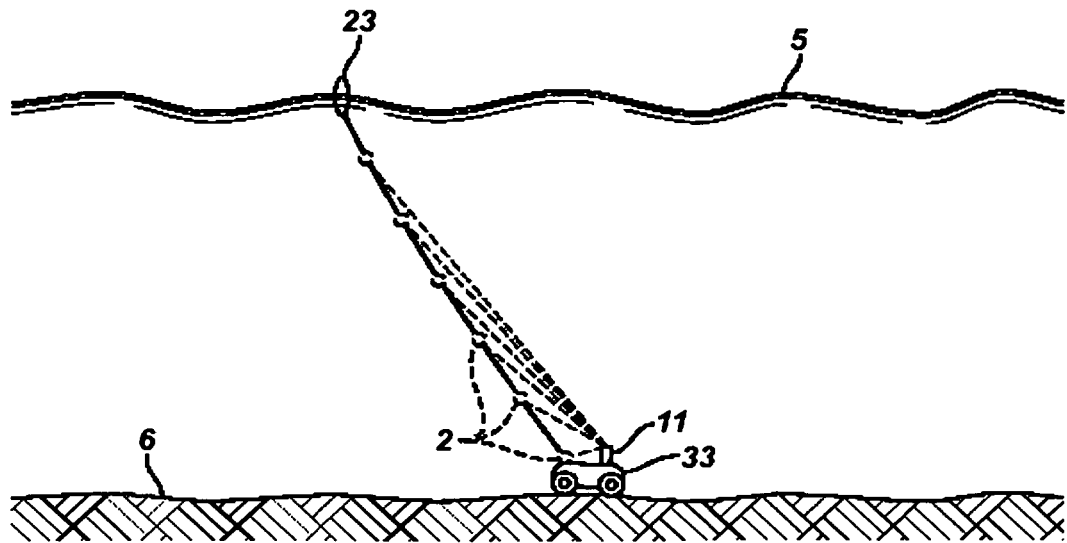

FIG. 8 illustrates an embodiment wherein neither a surface vessel nor a seabed cable is used. Rather, a vehicle 33 traverses seabed 6, vehicle 33 having a transmitter 11, and optionally one receiver 2. The remaining receivers are attached to a cable or rope 46a at known distances form vehicle 33. A float 23 maintains cable 46a substantially taught.

In all embodiments of the invention, receivers 2 need not be exactly in line; they may be centered about an average line.

Seabed seismic sensors and their support cables (herein referred to collectively as seabed cables) useful in the invention include those described in the article "Shear Waves Shine Brightly", Oilfield Review, pages 2-15 (1999), and typically comprise an instrumented cable packed with receivers, similar to the streamers that are towed in conventional marine surveys, but designed to operate on the seafloor. One seabed cable, known under the trade designation "NESSIE 4C", contains multiple sensing units each containing one hydrophone and three orthogonally oriented geophones inside the cable, distributing their weight for optimal coupling to the seafloor. Each cable may house hundreds of four-component sensors. Full particle-motion vector recording of all P and S wavefronts may be achieved, along with the pressure wavefront familiar from towed streamers. This design was an improvement over conventional ocean bottom cables, which may be employed in the present invention as well, comprising only a hydrophone and a vertically oriented geophone strapped to the outside; however, this arrangement is incapable of recording the full particle-motion vector and may not couple adequately to the seafloor. Published Patent Cooperation Treaty application no. WO 02/14905 A1, published Feb. 21, 2002, assigned to WestemGeco LLC, Houston, Tex. describes a seabed sensor unit and support cable that may have improve coupling to the seabed. The sensor unit comprises a one or more sensing elements disposed within a protective housing having a flat base. A flat base ensures that there is an adequate contact area between the sensor housing and the earth's surface, so that there is good acoustic coupling to the sensing element(s) mounted within the sensor housing. The housing is attached to a support cable. Furthermore, the dimensions of the base of the housing may be chosen so that the extent of the base in a direction parallel to the cable is similar to the extent of the base in a direction perpendicular to the cable, which may minimize the dependence of the acoustic coupling to the sensor housing, and thus to sensing elements within the housing, on the angle between the incident seismic energy and the cable.

Another seabed cable useful in the invention is described in U.S. Pat. No. 6,021,091, also assigned to WestemGeco, LLC, which describes an elongated ocean-bottom seismic cable section of a desired length manufactured by assembling a stress member in combination with a plurality of signal communication channels. A plurality of receiver clusters is fastened to the assembly at desired intervals. Each cluster includes at least two multi-axial, gimbal-supported seismic receivers that are symmetrically mounted about the axis of the cable assembly. Output signals from the common axes of the respective multi-axis receivers of each cluster are coupled with each other through a suitable filter and linked to corresponding signal communication channels. The cable section is terminated by connectors for providing mechanical and communication linkage to other sections and eventually to signal-processing instrumentation.

Streamers useful in the invention have well-known constructions, and may comprise a large number of similar 100 meter streamer, or different length sections connected end-to-end, each section comprising a substantially cylindrical outer skin containing a pair of longitudinally extending strength members to bear the towing forces. Acoustic transmitters and receivers may be substantially uniformly distributed along the length of the streamer section Another streamer construction comprises an elongate substantially solid core, at least one longitudinally extending strength member and a plurality of acoustic transmitters and receivers embedded in the core, a polymeric outer skin surrounding the core and defining there around an annular space, and polymeric foam material adapted to be substantially saturated with liquid and substantially filling the annular space.

Seismic streamers may normally be towed at depths ranging from about 3 to 20 meters below the surface of the water by means of a "lead-in", a reinforced electro-optical cable via which power and control signals are supplied to the streamer and seismic data signals are transmitted from the streamer back to the vessel, the vertical and/or horizontal position of the streamers being controlled by orientation members, or steerable "birds" distributed along the length of the streamer. Typically, the front end of the streamer is mechanically coupled to the lead-in by at least one vibration-isolating section (or "stretch section"), while the rear end is coupled to a tail buoy incorporating a GPS position measuring system, typically via another "stretch section". In accordance with one embodiment of the invention, a streamer or spread of streamers may alternately be towed at a variety of depths to obtain some knowledge at those depths. Alternatively, a failed streamer, (failed in the sense that it is disabled and cannot be used for some reason for seismic data acquisition) may be used, as discussed herein.

The following non-limiting example referring to FIG. 3 will further illustrate determination of sound velocity profile in accordance with the invention in operation.

Cable 4 with receivers 2 is first deployed from vessel 3 and arranged as described above. An acoustic signal is transmitted from transmitter 1. The same acoustic signal is detected by each of the receivers 2 and the apparent transmission delay at each of them is recorded. A geometric correction may be applied to all the measured transmission delays so that they correspond to a measurement taken exactly in the longitudinal direction of cable 4. For the best precision this correction should take into account the shape of the sonic rays, for instance using a system such as described in U.S. Pat. No. 6,388,948, which utilizes a device such as a computer or microprocessor for determining the effective sound velocity between underwater points. The following information is fed into the device: (i) an estimate of the sound velocity profile from a source of sound energy located at an initial depth to a predetermined final target depth, (ii) a predetermined set of grazing angles, (iii) a predetermined number of target depths between the initial depth and the final target depth, and (iv) a predetermined uniform set of elevation angles. A corresponding elevation angle and an effective sound velocity value is calculated for each grazing angle and target depth. The calculated elevation angles are scanned to locate a pair of calculated elevation angles which correspond to a pair of successive grazing angles and a particular target depth wherein the particular elevation angle of the uniform set is between the pair of calculated elevation angles. The calculated effective sound velocity values corresponding to each elevation angle of the pair of calculated elevation angles are interpolated to produce an interpolated effective sound velocity.

The measured delay is differenced against the adjacent receiver's measurement. The differences can in principle be formed in any combination, but for the maximum resolution of the determination of the sound velocity profile it will be preferable to difference adjacent measurements. The distances between adjacent receivers 2 can be calculated from the known position of them in the cable 4. The principles of the invention may be used in deep waters where the sound velocity profile is the most difficult to determine by conventional means and the accuracy of the sound velocity is the most critical for precise positioning near the seabed. If the vessel speed and cable deployment rate are synchronized or nearly so, the cable tension may be close to zero, and then the cable will in an ideal case form a straight line. In certain embodiments the surface end of the cable may be under relatively high tension because of the weight of cable 4, and it may be stretched accordingly. In order to compensate for this effect it is desirable to know the stretch coefficient of cable 4, together with the cable tension, otherwise results may be biased estimates. The stretch coefficient can be measured in advance and the tension can either be measured at vessel 3 or estimated using a hydrodynamic model taking into account vessel 3 speed and cable 4 deployment rate. Knowing the depth difference and the dip angle (using one or more inclinometers, for example) gives an angle and side of a triangle. It this information was precise enough, it could be used to calculate stretch, or calibrate a stretch model.

For each receiver interval there can then be made an estimate of the sound velocity as the ratio between the calculated receiver interval and the correspondingly differenced delay measurement. Cable 4 reaches all the way from the vessel 3 at the surface down to seabed 5, thus providing sound velocity estimates at each receiver interval through the water column. The sound velocity determined for each interval this way refers to a signal traveling at the dip angle of cable 4. To make this useful also at other dip angles a mapping function is needed. This can be performed for instance by the method of sonic ray tracing.

The accuracy of each estimate of the sound velocity is limited by the precision of the acoustic signal detection. In order to get a sound velocity profile with a useful accuracy it may be necessary to do more measurements and accumulate them in a statistically meaningful fashion. Seismic cable 4 is typically several kilometers long and receiver intervals as small as 25 meters or less. This gives room for many measurements to be taken and cancellation of random errors.

The sound velocity profile may then be determined in the form of a table using the statistics from results within certain depth intervals, or it may be determined by using a parameterized model where all the results are used to estimate the unknown parameters. A second approach would be able to take advantage of the fact that cable 4 is moving (continuously down during deployment, continuously up through retrieval) through the water column while the measurements are taken thus providing almost continuous information. Some of this detail may get lost when estimating the sound velocity layer by layer using previous methods.

The conventional ways of determining the sound velocity profile are time consuming and cannot in practice be repeated very often. The apparatus, systems, and methods of the invention do not require any stop of operation or alteration of the production procedures as the measurements can be taken automatically when seismic cable 4 is deployed on the seabed 5, or retrieved there from. The algorithm for determination of the sound velocity can be programmed into a computer that can calculate it automatically. The process can essentially be run at all times when deploying or retrieving a cable.

A typical use of the techniques of obtaining sound velocity of this invention will be to determine sound velocity while deploying a seismic seabed cable. The so-called long baseline method may be used to compute distances between receivers, and ultimately positions of the receivers. The receiver positions may be established by measuring transmission delays of acoustic signals from known locations near the sea surface to the cable at the bottom.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

The invention claimed is:

1. A method for geophysical exploration comprising:
   (a) deploying a seismic cable having a plurality of receivers for receiving acoustic signals, wherein a distance between two adjacent receivers is known;
   (b) generating and transmitting acoustic signals from at least two acoustic transmitters at known locations;
   (c) detecting the acoustic signals using acoustic receivers in the cable;

(d) measuring a time difference for reception of each signal at the two adjacent receivers and differences in arrival time between signals from the transmitters to each receiver; and
(e) calculating the sound velocity at the receivers using the time differences.

2. The method of claim 1 further comprising measuring depth of a receiver using a pressure measuring device located in the cable.

3. The method of claim 1 wherein the at least two acoustic transmitters at known locations include three vessel hull-mounted acoustic transmitters.

4. The method of claim 1 wherein the at least two acoustic transmitters at known locations are attached to a first vessel, wherein the cable is attached to a second vessel, which the first vessel and the second vessel are separate vessels.

5. The method of claim 1 wherein the at least two acoustic transmitters at known locations are attached to an underwater vehicle.

6. The method of claim 1 comprising calculating the actual distances between receivers from initial known positions of the receivers.

7. The method of claim 6 comprising determining the sound velocities of all previous known positions.

8. The method of claim 1 comprising determining the time measurement differences between non-adjacent receivers directly by autocorrelation of two recordings between non-adjacent receivers.

9. The method of claim 1 comprising accumulating time differences and/or distance measurements in one or more tables of sound velocity versus depth.

10. The method of claim 1 comprising calculating a sound velocity profile using the sound velocities in a parameterized model wherein results are used to estimate unknown parameters.

* * * * *